April 13, 1954  S. W. WARNER  2,675,454
WELDING OR SOLDERING APPARATUS
Filed Nov. 20, 1951
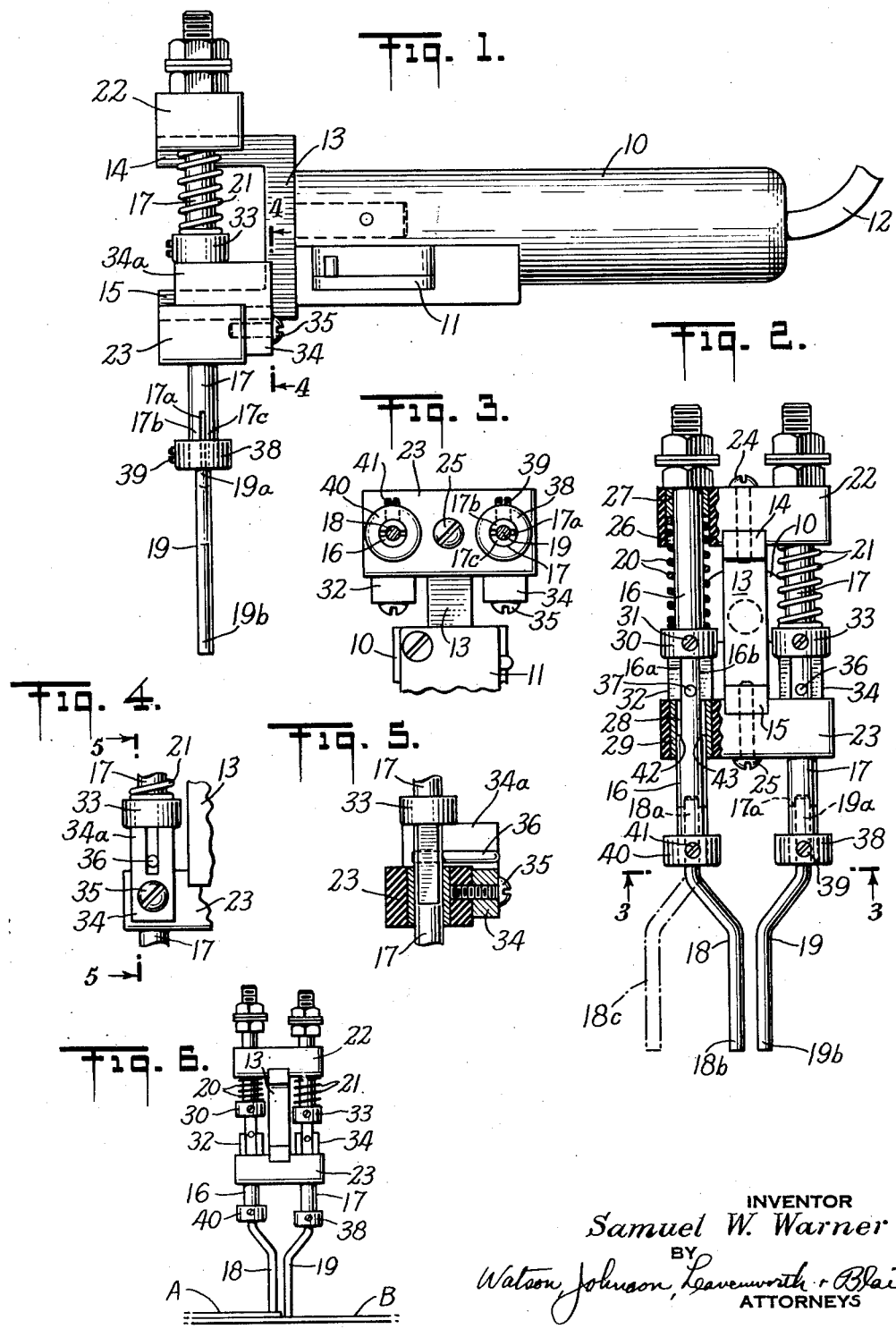
INVENTOR
*Samuel W. Warner*
BY
Watson, Johnson, Leavenworth & Blair
ATTORNEYS Patented Apr. 13, 1954

2,675,454

UNITED STATES PATENT OFFICE 2,675,454

WELDING OR SOLDERING APPARATUS

Samuel W. Warner, Newark, N. J.

Application November 20, 1951, Serial No. 257,320

2 Claims. (Cl. 219—4)

This invention relates to electric spot welding apparatus, and more particularly to an improved double floating electrode embodying to a certain extent the invention disclosed in my Patent No. 2,474,340.

As pointed out in my aforementioned patent, many advantages inhere in a spring-loaded floating electrode. The welding machine disclosed in that patent, however, is not too well adapted for certain types of welding.

For example, where it is desired to weld a large, thin sheet of metal, the thickness of which is of the order of .006"–.010", great difficulty is encountered in handling the sheet, i. e. in placing it over the fixed electrode in welding position because of the flexibility or pliability of the sheet; also because of the difficulty of supporting the sheet without tearing or otherwise damaging it, and because of its large size and bulkiness. Then too, where a small, light and possibly quite flimsy piece of metal is to be welded to a much larger piece, conventional spot welders do not lend themselves to convenient application. Then there are other requisites in spot welding where it is highly desirable that a plurality of welds be effected simultaneously because of the structural characteristics of the metal being welded, and in such cases the conventional spot welder is practically useless. Still further, there are occasions where a plurality of spot welds be simultaneously effected, but on different planes. It is obvious that in such instance the conventional spot welder is inadequate. It is accordingly among the objects of my invention to provide spot welding apparatus capable of overcoming the aforementioned difficulties in a thoroughly practical and efficient manner.

It is another object of my invention to provide spot welding apparatus characterized by simplicity, low initial and maintenance cost, versatility in adaptation to varying welding requirements and durability under extended periods of hard usage. Other objects will be in part apparent and in part pointed out hereinafter.

In the drawing, wherein I have shown one embodiment of my invention,

Figure 1 is a side elevation of my welding apparatus;

Figure 2 is a front elevation of the apparatus;

Figure 3 is a fragmentary horizontal section taken along the line 3—3 of Figure 2;

Figure 4 is a vertical fragmentary section taken along the line 4—4 of Figure 1;

Figure 5 is a vertical fragmentary section taken along the line 5—5 of Figure 4; and, Figure 6 is a view similar to Figure 2 but on a reduced scale, showing the application of my welding apparatus to a piece of work wherein a plurality of welds are to be simultaneously made at different levels.

Similar reference characters refer to similar parts throughout the views of the drawing.

As pointed out in some detail in my aforementioned patent, there are very substantial benefits inhering to so-called floating electrodes. By way of illustrating one application of my double floating electrode welding apparatus, it might be helpful to describe one type of welding which has been most efficiently effected by my device. Jet airplane engines are equipped, among other things, with an electric blanket, which blanket is of substantial size and comprises a pair of stainless steel metal sheets stuffed with suitable material, the thickness of the stainless steel sheets being of the order of .006"–.010". These blankets are, of course, subject to rather rough usage, in the course of which they are apt to be so pierced or ripped as to necessitate patching. Such tears or rips are repaired by small patches being welded thereover in such a manner as to prevent extension of the tear, irreparably damaging the blanket. Because of the large size of the blanket, it is certainly impracticable, if not impossible, to weld the patch by conventional spot welding apparatus. Much more conveniently, a small, light, manually operable and easily portable welding apparatus can repair the damage. In welding such patches, it is particularly advantageous simultaneously to make a plurality of spot welds, as a single weld might be inadequate to hold the patch in proper position until the next weld can be effected. Where it is requisite that the two pieces be welded in precise position, great difficulty is encountered in making individual spot welds as between successive welds displacement of the parts might readily occur, the resulting assembly being useless if the component pieces are inaccurately related. In such case, a plurality of simultaneous spot welds are highly advantageous.

These difficulties are effectively overcome by my novel welding apparatus which I shall now describe.

In accordance with one embodiment of my invention, the apparatus which is light-weight and accordingly readily portable, comprises in effect a handled tool, the handle of which carries a finger-operated microswitch operable to fire or discharge the welding circuit. On the end of this handle is a U-shaped bracket, to the legs of which are fastened dielectric blocks or supports which reciprocably carry a pair of rods. Each of these rods carries an electrode and has an associated spring which biases the rod and electrode toward the workpiece, means being provided to restrain rotation of the rods. Each rod is provided with lock nuts at its upper end, to which a lead from the transformer may be secured; each electrode is adjustably and replaceably mounted in its rod so that the spacing between the lower ends of the two electrodes may be varied in accordance with the welding requisites. By virtue of the electrodes being spring loaded, they are under spring pressure prior to firing of the welding circuit, so that during the fusion of the metal, the spring bias is immediately available to make a perfect weld, precluding production of a so-called smear weld which is well apt to tear loose under slight strain. As to this feature of my device, reference is made to a fuller discussion in my aforesaid patent.

Referring now to the drawing, the device includes a handle 10 to which is secured a microswitch 11 connected to a lead 12 which is connected to the transformer (not shown) so that upon actuation of the microswitch the transformer condensers are discharged in the usual manner. To the end of handle 10 is fastened a relatively heavy and accordingly rigid U-shaped bracket 13 having upper and lower arms 14 and 15. Reciprocably mounted in these arms are a pair of rods, generally indicated at 16 and 17 (see Figure 2), to the lower ends of which are adjustably and detachably attached electrodes 18 and 19. These rods, when the device is in use, are spring-biased downwardly by springs 20 and 21 so that the electrodes 18 and 19 are under spring load rather than force of gravity at the instant of firing of the welding circuit; thus the electrodes are much more rapidly effective because of the obviation of the inertia factor which would otherwise obtain were only the force of gravity relied on to exert downward pressure by the electrodes on the work.

More particularly, bracket arms 14 and 15 (Figure 2) have fastened thereto blocks 22 and 23 made from dielectric material, block 22 being fastened to the top of arm 14 as by a screw 24, block 23 being fastened to the bottom of arm 15 as by a screw 25. Block 22 is drilled to provide at its opposite ends a pair of holes, such as hole 26, the upper end of which receives a bushing 27. Block 23 is similarly drilled to provide a hole 28, into which is pressed a bushing 29. Thus bushings 27 and 29 slidably receive rod 16 with the upper end of spring 20 preferably entering hole 26 and bearing against the bottom of bushing 27, the bottom end of the spring bearing against a collar 30 fastened to rod 16 as by a set screw 31. Downward movement of rod 16 and its electrode 18 is limited by collar 30 engaging the upper end of an L-shaped block 32. It may accordingly be seen that rod 16 and its electrode 18 are under the constant downward bias of spring 20.

Rod 17 is slidably mounted in blocks 22 and 23 in a similar manner, with its spring 21 bearing against a collar 33 similar to collar 30 to place the rod and its electrode under a constant downward bias, the movement of the rod being limited by an L-shaped block 34 similar to block 32.

In Figure 1, it may be seen that block 34 is fastened to block 23 by a screw 35. The horizontal arm 34a of block 34 (see Figure 4) is bifurcated so as to embrace a pin 36 secured to and extending from rod 17. Accordingly this pin, by virtue of its sliding engagement in bifurcated arm 34, precludes any rotation of rod 17 and accordingly of its electrode 19. The horizontal portion of arm 32 is similarly bifurcated to receive an anti-rotation pin 37 which, being carried by rod 16, precludes rotation thereof. Thus rods 16 and 17 are restricted to reciprocal or axial movement, the importance of this restriction being brought out hereinbelow.

As hereinbefore noted with reference to Figure 2, electrodes 18 and 19 are detachably and adjustably secured to their respective rods 16 and 17. Thus the upper end 19a of electrode 19 is received in a hole drilled in the bottom of rod 17, the rod being slotted as at 17a, providing relatively movable ends 17b and 17c which may be pressed together to clamp electrode end 19a therebetween. After the upper end 19a of the electrode has been placed in the hole in rod 17, a collar 38 may be slipped over the lower end of rod 17 and a set screw 39 carried by the collar can be taken up to squeeze rod ends 17b and 17c tightly about the upper end of electrode 19, thus firmly securing the electrode to the lower end. The upper end 18a (Figure 2) of electrode 18 is similarly secured in the split lower end of its rod 16 by a collar 40 and a set screw 41. By thus attaching the electrodes to their respective rods, the electrodes may readily be adjusted or replaced as the occasion demands.

As shown in Figure 2, electrode 18 is bent so that the axis of its lower end 18b is displaced from, but preferably parallel to the axis of its upper end 18a. Electrode 19 is similarly bent so that its lower end 19b is displaced from but parallel to the axis of its upper end 19a. Thus, the lower ends 18b and 19b of the two electrodes may be as closely adjacent as desired so that the individual welds simultaneously made by the two electrodes may be spaced close to one another. This spacing, of course, may be varied as desired in accordance with the manner in which the two electrodes are bent. Furthermore, if it is desired to substantially space the welds made by the electrodes, one or the other, e. g. electrode 18, may be rotated 180° from its solid line position to its dotted line position 18c, which will provide substantial space. The anti-rotation pins 36 and 37 assure maintenance of the spacing of the electrodes. It might also be noted that rod 16 preferably includes flat portions 16a and 16b where the rod is embraced by block 32. These flats coact with pin 37 to preclude electrode rotation. The flats also provide shoulders 42 and 43 which by abutting against the bottom of block 32 limit upward movement of rod 16. Rod 17 is, of course, similarly formed. Obviously, if but a single weld is desired, one of the electrodes may be removed. This, of course, lends greatly to the versatility of application of my device, rendering it applicable to a wide variety of welding or soldering jobs.

In Figure 6, I have illustrated one unique application of my device. As shown herein, the work to be treated lies at different levels A and B, but because of the independent mobility of the two electrodes 18 and 19 both levels can be accommodated simultaneously and just as effectively as if the work were in a single plane.

The foregoing description has referred principally to the application of my device to welding. It should be understood, however, that the device is equally applicable where it is desired to solder the work rather than weld it.

Accordingly, I have provided a welding device which attains the several objects set forth hereinabove in a thoroughly practical and efficient manner.

I claim:

1. In portable hand operable welding apparatus, in combination, a handle, a pair of spaced supporting and guiding members secured to said handle, a pair of electrode carriers independently slidably mounted in parallel juxtaposition in said members, spring means associated with said members and with said carriers to exert a constant bias on said carriers tending to move them in one direction, cooperating means associated with said members and said carriers to preclude rotational movement of said carriers, and an electrode secured to each of said carriers.

2. Apparatus according to claim 1, wherein the spring means comprise a coiled spring surrounding each of said carriers and disposed between said members, and means to limit downward movement of said carriers.

References Cited in the file of this patent

UNITED STATES PATENTS

| Number | Name | Date |
| --- | --- | --- |
| 1,049,920 | Rietzel | Jan. 7, 1930 |
| 2,137,909 | Hagedorn | Nov. 22, 1938 |
| 2,221,646 | McPherson | Nov. 12, 1940 |
| 2,272,968 | Dyer | Feb. 10, 1942 |
| 2,295,195 | Barnum | Sept. 8, 1942 |
| 2,300,700 | Porter | Nov. 3, 1942 |
| 2,474,340 | Warner | June 28, 1949 |